United States Patent

[11] 3,596,872

| [72] | Inventor | George P. Greenamyer<br>Monrovia, Calif. |
|------|----------|------|
| [21] | Appl. No. | 13,925 |
| [22] | Filed | Feb. 25, 1970 |
| [45] | Patented | Aug. 3, 1971 |
| [73] | Assignee | International Telephone and Telegraph Corporation<br>New York, N.Y. |

[54] VALVE ASSEMBLY
14 Claims, 2 Drawing Figs.

| [52] | U.S. Cl. | 251/77, 251/357 |
|------|---------|-----------------|
| [51] | Int. Cl. | F16k 31/44 |
| [50] | Field of Search | 251/77, 357, 358 |

[56] References Cited
UNITED STATES PATENTS

| 2,055,133 | 9/1936 | Newell | 251/77 X |
| 2,297,872 | 10/1942 | Carter et al. | 251/77 |
| 2,386,940 | 10/1945 | Drane | 251/357 |
| 2,702,052 | 2/1955 | Grayson | 251/77 X |
| 3,173,653 | 3/1965 | Valentine | 251/358 |
| 3,381,931 | 5/1968 | Boonshaft et al. | 251/77 X |

*Primary Examiner*—Henry T. Klinksiek
*Attorneys*—C. Cornell Remsen, Jr., Walter J. Baum, Paul W. Hemminger, Charles L. Johnson, Jr. and Thomas E. Kristofferson ABSTRACT: A valve assembly having a poppet with a hole all the way therethrough. A screw is threaded in the hole at one end of the poppet, but the screw head is positioned inside the hole so that access thereto is provided through the hole. After adjustment, the screw may be held in a fixed position by applying a sealing compound to it to bond it to the poppet. A valve is formed by snapping a rubber cover around a disc. The poppet may be made of a low cost, single metal stamping. The disc may, thus, be an integral portion of the poppet.

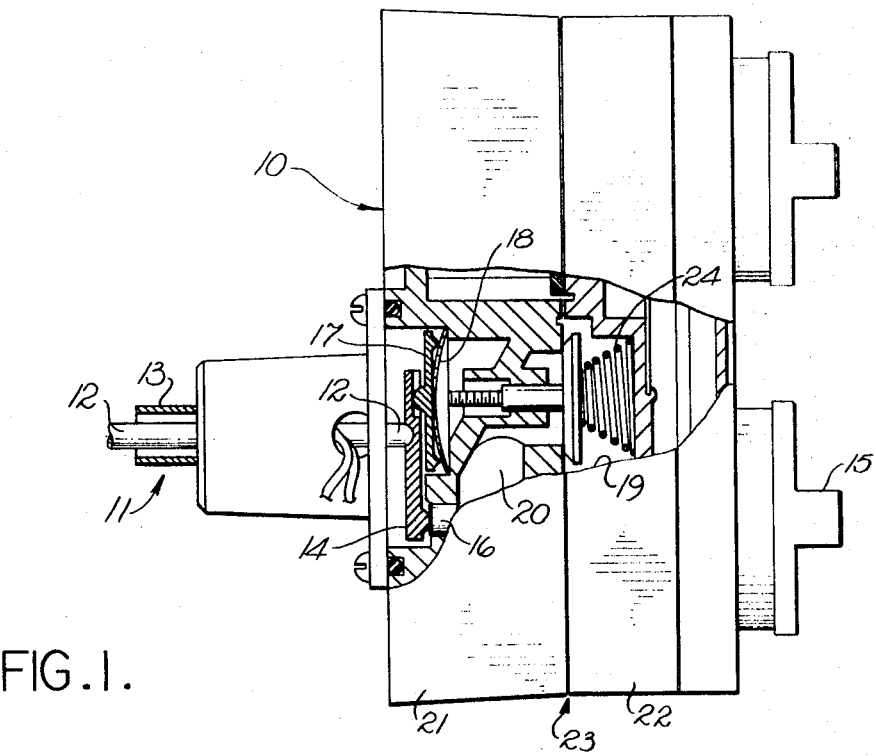
FIG. 1.
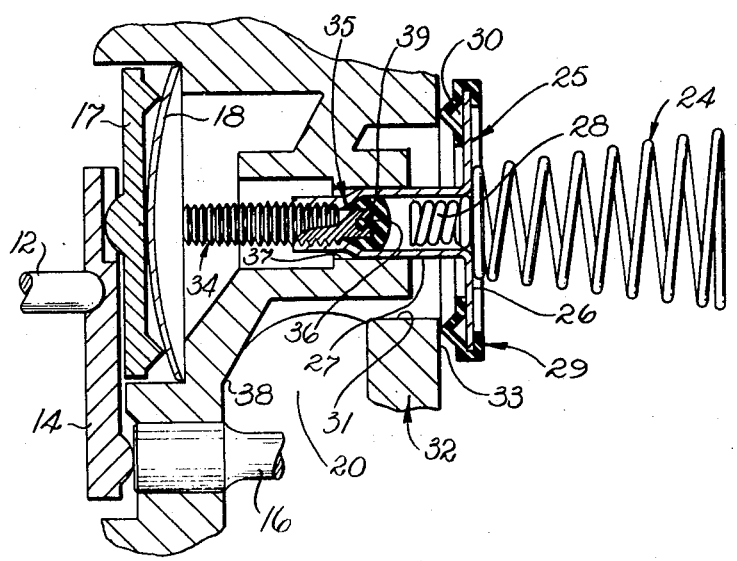
FIG. 2.
INVENTOR.
GEORGE P. GREENAMYER
BY
ATTORNEY

VALVE ASSEMBLY

BACKGROUND OF THE INVENTION

This invention relates to fluid control apparatus and, more particularly, to a valve.

Poppet valves with flange and guide stem are required in many types of thermostatic control devices, particularly those wherein the valve is lifted from its seating surface by movement of a snap actuator against the end of the stem.

Precise adjustment of the effective stem length relative to the actuator is required. This is usually provided by an adjustable abutment screw threaded into the end of the stem.

In conventional structures, the screw can only be adjusted at the end of the stem with the poppet valve removed from the control. Since the adjustment must be made critically to match the actuator position in each individual control, this often requires several operations such as 1. Initial trial adjustment.
2. Assembling valve to control.
3. Testing valve lift with actuator movement.
4. Removal for readjustment.
5. Reassembly and retest.
6. Removal and further readjustment, etc.

Many prior art valves have flanges which are rubber covered to rest on a hard valve seat.

The prior art rubber covering is either bonded to or clamped to the flange. In either case, the rubber is frequently distorted and will not make a good seal with the valve seat.

Poppet valves are also somewhat expensive because they require a number of component parts.

SUMMARY OF THE INVENTION

In accordance with the device of the present invention, the above-described and other disadvantages of the prior art are overcome by providing a poppet valve with a stem having a hole through the entire length thereof. This permits access to the screw from the top of the poppet flange. The screw may, thus, be adjusted with the valve in place and without the difficulties attendant upon the use of prior art valves as described above. That is, valve removal is unnecessary for adjustment. The valve may, thus, be adjusted without disassembly and assembly as in the prior art.

The above-described and other advantages of the invention will be better understood from the following description when considered in connection with the accompanying drawings.

BRIEF DESCRIPTION OF THE DRAWINGS

In the drawings which are to be regarded as merely illustrative:

FIG. 1 is a side elevational view, partly in section, of a valve constructed in accordance with the present invention; and FIG. 2 is an enlarged sectional view of the valve shown in FIG. 1.

DESCRIPTION OF THE PREFERRED EMBODIMENT

In the drawings, in FIG. 1, a gas water heater control is indicated at 10 having a conventional rod and tube thermostat 11 with a rod 12 and a tube 13. Rod 12 pushes a lever 14. The fulcrum of the lever may be adjusted by knob 15 which moves a shaft 16 to the left or to the right as viewed in FIG. 1. Knob 15, shaft 16, the method of adjustment, and lever 14 may be entirely conventional. The same is true of a plate 17 and a snap disc 18.

The valve of the present invention may have an inlet at 19 and an outlet at 20. Control 10 may have separate portions 21 and 22 which may be placed between portions 21 and 22 at 23. Portions 21 and 22 are held together by a screw, as is conventional. The valve of the present invention is held closed by a spring 24 shown in FIGS. 1 and 2. Spring 24 is held in compression by the valve body portion 22 and a valve poppet 25. Poppet 25 has substantially perfect symmetry with the symmetrical axis of spring 24. Poppet 25 has a plate 26 which is integral with the hollow cylindrical shaft 27. Spring 24 is a substantially open coiled helical spring having closed end turns 28 which fit snugly inside shaft 27.

A rubber wrap 29 is provided around the cylindrical edge of plate 26 with an annular hollow V-portion 30. V-portion 30 seals off an opening 31 in a web 32 which provides a valve seat 33.

The outside diameter of plate 26 may be greater than the maximum inside diameter of wrap 29. Thus, wrap 29 may provide an interference fit on plate 26. A screw 34 is threaded into the left end of shaft 27 as viewed in FIG. 2. Screw 34 has a head 35 with a screw driver slot 36 therein.

In the assembly of the control 10 with the valve of the present invention, screw 34 is adjusted in position for proper operation. However, it is unnecessary to remove poppet 25 from the bore 37 of a web 38 because the screw head 35 can be reached through hollow shaft 27 with spring 24 removed. Substantial time in calibration and assembly is thus saved.

After screw 34 has been approximately adjusted, a sealing compound 39 may be applied to screw 34 to fix it in position relative to shaft 27. From the foregoing, it will be appreciated that wrap 29, by not being bonded or clamped to plate 26, provides an undistorted and good seal.

It is also a feature of the invention that poppet 25 may be made with a single, low cost metal stamping. Poppet 25 includes only flat plate 26 and a single shaft 27.

I claim:

1. A valve assembly comprising: a valve housing; a poppet movable relative to said housing on a predetermined axis; first means to move said poppet, said poppet having second means extending toward said first means; and a device mounted on one of said means in a position to engage the other of said means, said device being adjustable in position on said one means toward and away from said other means, said poppet having and end spaced from said second means, said poppet having a hole through said end and a passageway in communication with said hole and extending completely through said poppet, said hole exposing said device in said passageway to permit access to said device for adjustment thereof.

2. The invention as defined in claim 1, wherein said housing includes an annular valve seating having a hole therethrough, said poppet including a circular plate of uniform thickness throughout its extent, said plate being perpendicular to said axis and larger in diameter than said hole, said flange being symmetrical about said axis, a hollow cylinder of substantially uniform thickness throughout its extent, said cylinder having concentric approximately cylindrical internal and external surfaces, one end of said cylinder being substantially symmetrical about said axis, said housing having a cylindrical bore, said cylinder being slidable in said bore, said cylinder and said plate being integral and made of a single metal stamping, said plate being disposed on the side of a seat opposite that on which said bore is located, a resilient rubber cover around the edge of said plate, said cover being substantially U-shaped, said cover covering a portion of each face of said plate and extending around the edge thereof, the inside of said cover on each said face being circular and having a diameter less than that of said plate, a portion of said cover extending toward said valve seat in the shape of a hollow V-ring, an open coiled spring in compression between said housing an said plate on the side of said plate opposite said valve seat, said plate having a hole therethrough in registration with the hole through said cylinder, said spring having a plurality of end turns slidable through said plate hole into said cylinder hole, said end turns being closed coil turns, the remaining turns of said coil being larger in diameter than said plate hole, one end of said cylinder opposite the ends fixed to said plate having an internal helical screw thread, said device including a set screw threaded inside of said one cylinder end, said screw having a screw driver slot in the head thereof, said head being located between the other end thereof and said plate inside said cylinder, means to prevent rotation of said screw relative to said cylinder, said first means being engageable with said other screw end to push said cylinder in said bore in a direction to lift said rubber cover off of said valve seat, said hollow V-ring having a diameter larger than said valve seat hole.

3. The invention as defined in claim 1, wherein said housing has a web, said web having a bore therein, said second means being a hollow shaft slidable in said bore, a member fixed to said poppet end for closing the valve, said member having a hole therethrough in at least partial alignment with the hollow interior of said shaft, said shaft having both of its opposite ends open, said shaft having said passageway therethrough, free and open communication being provided from one side of said web to the other through said member hole and said shaft passageway, at least one end of said shaft opposite that connected to said member having an internal helical screw thread, said device including a screw threaded into said passageway at said one shaft end, said screw having a head inside said passageway which may be turned.

4. The invention as defined in claim 3, wherein said screw head has a screw driver slot.

5. The invention as defined in claim 4, wherein means are provided to prevent rotation of said screw relative to said shaft.

6. A valve assembly comprising: a valve housing; a shaft, said shaft being hollow throughout its entire length and open at both of its ends, said housing having a web with a hole therethrough, said housing including a valve seat around said hole in a position spaced therefrom, said shaft having one end slidable through said hole and means providing a valve closure to rest on said seat, said means including a member fixed to the other shaft end, said member having a hole therethrough at least in partial alignment with the opening at said one shaft end.

7. The invention as defined in claim 6, wherein said shaft and said member are made integral with one another.

8. The invention as defined in claim 7, wherein said shaft and said member are a single stamping made of solid metal.

9. The invention as defined in claim 8, wherein said shaft has approximately cylindrical internal and external surfaces concentric about the same axis, said member being substantially a plate having a uniform thickness and a cylindrical edge, said plate having flat, parallel surfaces at different positions along said axis, said flat surfaces being in respective planes perpendicular to said axis, the maximum diameter of said member hole being larger than the inside diameter of said cylinder said cylinder said member being connected to said shaft by a horn-shaped flared portion whose internal and external surfaces are parallel and are surfaces of revolution about said axis, said member being symmetrical with said axis.

10. A valve comprising: a body having a peripheral edge located in substantially a single plane, said body having upper and lower surfaces; and a wrap for said edge, said wrap having upper and lower annular portions covering at least respective portions of said upper and lower surfaces adjacent said edge, said wrap portions being connected by another portion extending around said edge from said lower wrap portion to said upper wrap portion, said body being hard relative to said wrap, said wrap being soft relative to said body, said wrap being resilient, said lower wrap portion being adapted to seal with a valve seat, said lower wrap portion being formed with a hollow portion pointing downwardly.

11. The invention as defined in claim 10, wherein said hollow portion is formed with a hollow V pointing downwardly.

12. A valve comprising: a body having a peripheral edge located in substantially a single plane, said body having upper and lower surfaces; and a wrap for said edge, said wrap having upper and lower annular portions covering at least respective portions of said upper and lower surfaces adjacent said edge, said wrap portions being connected by another portion extending around said edge from said lower wrap portion to said upper wrap portion, said body being hard relative to said wrap, said wrap being soft relative to said body, said wrap being resilient, said lower wrap portion being adapted to seal with a valve seat, said body including a substantially flat plate having parallel upper and lower surfaces, and a cylindrical edge surface having a central axis perpendicular to planes through said upper and lower surfaces, one side of said wrap having a U-shaped cross section in a plane through said axis, the legs of the U being joined to the base at right angles, said wrap having a thickness uniform substantially throughout its extent, said wrap being defined between concentric surfaces of revolution about said axis.

13. The invention as defined in claim 12, wherein said lower wrap portion is formed with a hollow portion pointing downwardly.

14. The invention as defined in claim 12, wherein said wrap has a hollow V pointing downwardly from said lower plate surface.